UNITED STATES PATENT OFFICE.

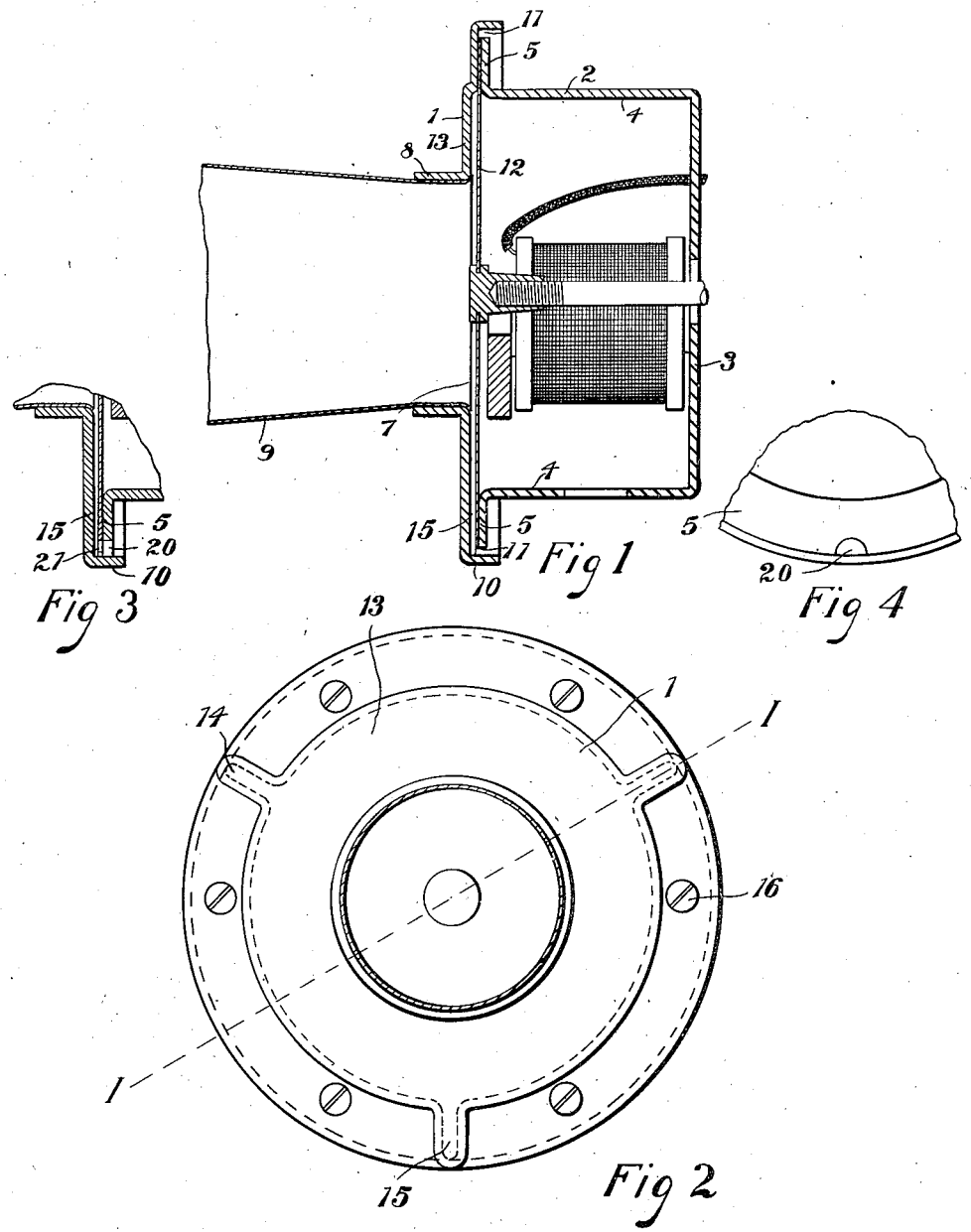

RAY H. MANSON, OF ELYRIA, OHIO, ASSIGNOR TO THE GARFORD MANUFACTURING COMPANY, OF ELYRIA, OHIO, A CORPORATION OF OHIO.

AUTOMOBILE-HORN.

1,164,836.  Specification of Letters Patent.  Patented Dec. 21, 1915.

Application filed October 12, 1912. Serial No. 725,420.

*To all whom it may concern:*

Be it known that I, RAY H. MANSON, a citizen of the United States, residing at Elyria, in the county of Lorain and State of Ohio, have invented certain new and useful Improvements in Automobile-Horns; and I do hereby declare the following to be a full, clear, and exact description of the invention, such as will enable others skilled in the art to which it appertains to make and use the same.

This invention relates to automobile horns, which are more particularly adapted for use upon conveyances, such as automobiles, motor boats and the like, though I do not desire to limit my invention to use as signal devices employed in this service only.

My invention is directed to the same general purposes as that disclosed in the application of William W. Dean #624,330, filed May 1st, 1911 and in my Patent #1,020,768, Mar. 19, 1912, my object being to improve upon the devices disclosed in order to produce a more simple article which can be more cheaply and conveniently manufactured and which will more effectively produce the results desired with less interference with the signaling.

Other objects of my invention and the invention itself will be better understood from the detailed description of the device illustrated.

Figure 1 shows a section of one form of my device taken through the line I—I of Fig. 2. Fig. 2 is a front elevation of the modification shown in Fig. 1. Figs. 3 and 4 illustrate a modification of the invention as illustrated in Figs. 1 and 2.

Referring first to the form illustrated in Figs. 1 and 2, I show a plurality of parts 1 and 2 which form the walls of a chamber, and here I have only shown two parts, though it will be obvious that any number may be employed. The part 2 constitutes the rear of the chamber, and in the form shown, is illustrated as a cup-like member, having a bottom 3 and side walls 4. The edges of the walls may be folded outward as shown at 5, preferably substantially at right angles to the walls 4. The part 1 constitutes the front of the chamber, and may be compared to the top of the cup, since it is intended to fit over that part to close the top thereof. The front should be perforated as shown at 7, to permit the escape of sound waves, and may have a boss 8 formed around the edge of the opening, to which a resonator 9 may be attached.

The edge of the part 1 may be folded over the end of the part 5 as shown at 10. In the form shown in Figs. 1 and 2, a channel 11 is left between the part 10 and the edge of the annular member 5. A sonorous member, such as a diaphragm 12 is clamped between two of the parts forming the walls of the chamber, and is here shown as clamped between the annular member 5 and the front. This member may be a vibratile diaphragm with its edges clamped, as described.

The center portion of the part 1 is preferably elevated, as shown at 13, to permit the diaphragm to vibrate without striking this part. In order to prevent the accumulation, in this portion of the chamber, of foreign matter, such as dirt, dust and water which enter the opening 7, I provide draft channels, through which the air rushes, drawing this matter through the chamber, and out without permitting it even to remain in contact with the diaphragm, where it would interfere with the sound produced.

In the form illustrated in Figs. 1 and 2, I have created a suitable number of arms 14 to the elevated part 13. These parts form passage ways or channels, as shown at 15 in the front and between the diaphragm and the wall of the front part 1, and communicating with the channel 11, furnish a clear passage way for the air and foreign matter through the instrument.

The front may be formed, as illustrated, by punching it from a single piece of metal, and is fastened to the rear by suitable fastening means, such as screws 16.

In the form illustrated in Figs. 3 and 4, the part 5 of the member 2 is cut away at 20 to form a niche in the edge thereof, which communicates with the passage 15, the part 10 being here folded over to fit snugly against the end of the annular member 5. The diaphragm may also be cut away to form a niche 21 in the edge thereof to correspond with the niche 20 in the part 5, thus creating a passage as shown in Fig. 3 for the purposes described in connection with Figs. 1 and 2.

In this application I do not claim broadly a draft hole, for clearing the chamber of an automobile horn, but particular apparatus such as I have illustrated for accomplishing this end.

It will be apparent to those skilled in the art that numerous and extensive departures may be made from the particular forms of the invention illustrated and from the details thereof, without departing from the spirit of my invention, these forms being shown for the purpose of illustrating the invention, and not for limiting me to the details thereof.

I claim:—

1. In an automobile horn, the combination of a plurality of parts forming the walls of a chamber, one of said parts being cup-shaped and having an annular member around the edge, such annular member being cut away to form a niche in its edge, a diaphragm clamped around its edge between the annular member and the front wall of the chamber, the edge of the front wall of the chamber being folded over the edge of the annular member, said front wall being formed to create a passage between the front wall and the diaphragm, such passage connecting the chamber with the niche in the annular member, whereby foreign matter may escape from the diaphragm, and means to operate said diaphragm.

2. In an automobile horn, the combination of a plurality of parts forming the walls of a chamber, one of said parts having a niche cut in the same, and a second of said parts being formed to create a passage between the interior of the chamber and said niche to permit the escape of foreign matter from the chamber and a sonorous member and means to operate the same in the chamber.

3. In an automobile horn, the combination of a plurality of parts forming the walls of a chamber, one of said parts being cup-shaped and having its edge folded outward substantially at right angles to the walls of the cup-shaped member, such folded outward part having a niche cut therein, such parts being formed to create a passage way from the interior of the chamber, through such niche, to permit the escape of foreign matter from the chamber, a sonorous member and means to operate said member.

4. In an automobile horn, the combination of a plurality of parts forming the walls of a chamber, one of said parts being cup-shaped and having its edge folded outward substantially at right angles to the walls of the cup-shaped member, such folded outward edge being cut away to form a niche in the edge thereof, a second part forming a cover for said cup having its edge folded over the edge of the cup-shaped member, a diaphragm clamped between said members, such parts being formed to create a passage way between the diaphragm and the walls of the chamber communicating at one end with the interior of the chamber and the niche to permit the escape of foreign matter from the chamber, and means to operate said diaphragm.

In testimony whereof, I have signed my name in the presence of two witnesses.

RAY H. MANSON.

Witnesses:
D. A. GLOVER,
F. O. RICHEY.